3,165,553
PRODUCTION OF N-METHYL SUBSTITUTED
ETHYLENE DIAMINE
Franz Koenig, Offenbach (Main), Germany, assignor to Deutsche Gold- und Silber-Scheideanstalt vormals Roessler, Frankfurt am Main, Germany
No Drawing. Filed Nov. 28, 1960, Ser. No. 71,927
Claims priority, application Germany, Dec. 4, 1959,
D 32,046
4 Claims. (Cl. 260—583)

The present invention relates to an improved process for the production of N-methyl substituted ethylene diamine.

It is known that N-monosubstituted ethylene diamines can be produced from $\beta$-halogen ethylene amine halogen salts and primary amines in the presence of alkalies according to the following reaction:

Hal—$CH_2$—$CH_2$—$NH_2$.HHal+$RNH_2$+2NaOH
  =RNH—$CH_2$—$CH_2$—$NH_2$+2NaHal+2$H_2O$

The yields of N-monosubstitued ethylene diamine obtained in this reaction are unsatisfactory, as the choice of the starting materials can promote a considerable number of side reactions. A further considerable technical disadvantage is caused by the fact that the monosubstituted diamine is obtained in an aqueous medium and therefore can only be recovered in water free form by costly procedures. It is also known from German Patent No. 446,547 that N-methylethylene diamine can be prepared from N-methylguanidomethanol by splitting off urea with the aid of hydrochloric acid.

According to the invention it was found that monomethyl ethylene diamine can be produced in water free state in good yields by hydrogenating methylene amino acetonitrile ($CH_2$=N—$CH_2CN$) or respectively its trimer ($CH_2$=N—$CH_2CN$)$_3$ (Johnson & Rinehart, J. Am. Chem. Soc. 46, 772, 1924).

The hydrogenation can be effected with suitable reduction systems, for example, with hydrogen in "statu nascendi" as obtainable by the action of acids or bases on metals. Preferably, however, catalytic hydrogenation is employed. Of the known hydrogenation catalysts, Raney-catalysts are preferred. Raney-nickel and Raney-cobalt which can be used singly or in combination have proved especially good. 1 to 10 grams of the Raney-catalyst are required per mol of methylene amino acetonitrile to be hydrogenated. However, such catalyst is not exhausted after one hydrogenation and after the crude amine produced has been decanted from the catalyst, the latter can be used for further hydrogenations.

The hydrogenation preferably is effected at moderately elevated temperatures. A noteworthy take-up of hydrogen begins at 50° C. The most favorable hydrogenation temperatures are between 70 and 90° C. The temperature can be increased to 120° C. to increase the speed of the reaction. Temperatures over 120° C. have been found less suitable in view of the increased formation of by-products at higher temperatures.

It is of advantage to carry out the hydrogenation according to the invention under superatmospheric pressures. Preferably gauge pressures of 30 to 200 atmospheres are employed. Gauge pressures higher than 100 atmospheres, however, only have the advantage that the hydrogen need be supplemented after longer time intervals.

All solvents usually suitable for hydrogenations can be used in the process according to the invention. However, methanol and dioxane have proved particularly suited. As the recovery of the water free amine from its aqueous solution causes considerable difficulties and is costly, it is advisable to use the solvents in water free form. The reaction product can then be recovered in completely pure and water free form simply by distilling off the solvent and subsequent distillation or crystallization of the reaction product. It is also possible, and particularly when the process is carried out continuously, to employ the hydrogenated crude amine mixture as the solvent. It is not necessary that the starting methylene amino acetonitrile be completely dissolved in the solvent as the hydrogenation can be carried out just as well with the starting material suspended in the solvent.

The crude amine mixture produced in the hydrogenation preponderantly is composed of N-monomethyl ethylene diamine. About 20 to 25% of N,N-dimethyl ethylene diamine and up to about 5 to 10% of higher polyamines are produced as by-products. These amine mixtures can easily be separated from each other by known procedures, such as by distillation or crystallization.

The process according to the invention not only renders it possible to produce N-monomethyl ethylene diamines directly in water free form in good yields but also makes use of a starting material which is easily obtainable in good yields from readily available and non-expensive starting materials.

The product produced by the process according to the invention is a valuable intermediate in the pharmaceutical industry for the production of, for example, spasmolytics, antihistamines or antimalarial compounds.

The following examples will serve to illustrate several embodiments of the process according to the invention.

*Example 1*

204 g. (3 mol) of methylene amino acetonitrile in 900 cc. of methanol and 5 g. of Raney-Ni and 5 g. of Raney-Co were introduced into a 1½ liter autoclave provided with stirring and heating and cooling means. Thereafter hydrogen was injected at room temperature until the mixture was saturated and the gauge pressure then adjusted to 100 atmospheres. The autoclave was then heated and take-up of hydrogen began at 50–60° C. During the hydrogenation further hydrogen was injected into the autoclave as it was used up in order to maintain an average gauge pressure of 100 atmospheres. During the course of the reaction the temperature was permitted to rise to 90–100° C. and at the end the gauge pressure was raised to 150–200 atmospheres. With a gas space of about 450 cc., 450 atmospheres of hydrogen were consumed within three hours or, in other words, 195 normal liters as against a theoretical 200 liters. The hydrogen consumption therefore was 97% of the theoretical. After the hydrogenation was completed the autoclave was cooled to room temperature, the pressure released and the contents filtered to remove the catalyst. The reaction product was separated from the solvent by distillation at atmospheric pressure using a 1 meter Raschig column provided with a dephlegmator. The yield of crude amine was 210 to 220 g. which was 95–100% of the theoretical.

The procedure described above was repeated six times more using 3 mol of methylene amino acetonitrile each time and upon fractional distillation in two passes of the combined products of the 7 hydrogenations the following were recovered:

322 g. (=20.6% of the theoretical) of N,N-dimethyl ethylene diamine. B.P. at 100 mm. 52–54° C., $n_D^{25}$=1.4293

1095 g. (=70% of the theoretical) of N-methyl ethylene diamine. B.P. at 100 mm. 60–62.5° C., $n_D^{25}$=1.4413

*Example 2*

The procedure of Example 1 was repeated except that the autoclave was heated to 110–120° C. within the first few minutes. In this case 350 atmospheres of hydrogen were already taken up within 1 hour which with a 450 cc.

gas space amounts to 160 normal liters or 80% of the theoretical. After a further 1½ hours, only a further 80 atmospheres of hydrogen were consumed by the time a constant pressure was reached. The reaction product was processed as in Example 1. 212 g. of crude amine which is 95% of the theoretical were obtained.

The procedure of this example was repeated four times more and the combined crude amine product 1040 g. was fractionally distilled under a partial vacuum in two passes. The following were recovered:

(1) 296 g. N,N-dimethyl ethylene diamine=26% of the theoretical; B.P. 100 mm. 52–54° C. M.P. of picrate 212° C.
(2) 605 g. N-methyl ethylene diamine=55% of the theoretical, B.P. 100 mm. 60–62.5° C. M.P. of picrate 223° C.
(3) Polyamine which distilled with partial decomposition at 61–109° C. under a 3 mm. pressure+water soluble residue 104 g.

The picrates of both the monomethyl and the dimethyl ethylene diamine products when mixed with standard comparative compounds produced no melting point depression.

I claim:

1. A process for the production of N-methyl ethylene diamine which comprises hydrogenating N-methylene amino acetonitrile trimer in a water free inert organic solvent at a temperature of 50 to 120° C. under a gauge pressure of 30 to 200 atmospheres.

2. A process for the production of N-methyl ethylene diamine which comprises hydrogenating N-methylene amino acetonitrile trimer catalytically in a water free inert organic solvent at a temperature of 50 to 120° C. under a gauge pressure of 30 to 200 atmospheres.

3. The process of claim 2 in which a Raney catalyst is employed for such hydrogenation.

4. The process of claim 2 in which said hydrogenation is carried out at 70 to 90° C.

References Cited by the Examiner
UNITED STATES PATENTS
2,292,949    8/42    Lazier et al. _____ 260—583 XR OTHER REFERENCES
Wagner et al.: "Syn. Organic Chemistry," J. Wiley and Sons, New York, pages 658 and 660 (1953).

CHARLES B. PARKER, *Primary Examiner.*
LEON ZITVER, *Examiner.*